US010617122B2

(12) United States Patent
Tomita et al.

(10) Patent No.: US 10,617,122 B2
(45) Date of Patent: Apr. 14, 2020

(54) PLANT VIRUS INFECTION INHIBITOR AND A METHOD FOR INHIBITING PLANT VIRUS INFECTION USING THE SAME (71) Applicant: AJINOMOTO CO., INC., Tokyo (JP)

(72) Inventors: Reiko Tomita, Iwate (JP); Naoki Kadotani, Kanagawa (JP); Kentaro Sekine, Iwate (JP)

(73) Assignee: AJINOMOTO CO., INC., Tokyo (JP)

( * ) Notice: Subject to any disclaimer, the term of this patent is extended or adjusted under 35 U.S.C. 154(b) by 104 days.

(21) Appl. No.: 14/250,515

(22) Filed: Apr. 11, 2014

(65) Prior Publication Data
US 2014/0219993 A1 Aug. 7, 2014

Related U.S. Application Data (63) Continuation of application No. PCT/JP2012/075542, filed on Oct. 2, 2012.

(30) Foreign Application Priority Data

Nov. 1, 2011 (JP) ................. 2011-239948

(51) Int. Cl.
*A01N 63/02* (2006.01)
*A01N 37/46* (2006.01)
*A01N 37/44* (2006.01)

(52) U.S. Cl.
CPC ............. *A01N 63/02* (2013.01); *A01N 37/44* (2013.01); *A01N 37/46* (2013.01)

(58) Field of Classification Search
None
See application file for complete search history.

(56) References Cited

U.S. PATENT DOCUMENTS

| 4,867,974 A | 9/1989 | Fujii et al. | |
|---|---|---|---|
| 8,617,852 B2 | 12/2013 | Takeshita et al. | |
| 2008/0014618 A1* | 1/2008 | Bathe | C12N 9/1217 435/115 |
| 2010/0033055 A1 | 2/2010 | Nakatani | |
| 2010/0330055 A1* | 12/2010 | Igarashi | A01N 63/02 424/93.45 |

FOREIGN PATENT DOCUMENTS

| CN | 1136393 | 11/1996 | | |
|---|---|---|---|---|
| CN | 102190534 | 9/2011 | | |
| GB | 2224209 | 5/1990 | | |
| JP | 60-004103 | 1/1985 | | |
| JP | 62-230707 | 10/1987 | | |
| JP | 64-009904 | 1/1989 | | |
| JP | 01-272509 | 10/1989 | | |
| JP | 01-281079 | 11/1989 | | |
| JP | 01-289490 | 11/1989 | | |
| JP | 05-137580 | 6/1993 | | |
| JP | 06-080530 | 3/1994 | | |
| JP | H 0680530 | * 3/1994 | | |
| JP | 07-025718 | 1/1995 | | |
| JP | 2001-072521 | 3/2001 | | |
| JP | 2009-007220 | 1/2009 | | |
| JP | WO 2009088049 A1 | * 7/2009 | ........... C12N 9/1205 |
| JP | WO 2009088074 A1 | * 7/2009 | ............ A01N 63/02 |
| JP | 2011-074047 | 4/2011 | | |
| WO | WO01/82698 | 11/2001 | | |
| WO | WO2005/059112 | 6/2005 | | |
| WO | WO2013/065439 | 5/2013 | | |

OTHER PUBLICATIONS

Oxford Dictionary of Biochemistry and Molecular Biology. Guanylic acid.Inosinic acid.Oxford University Press (publisher). Second edition. Copyright 2006. The General Editors. New York, New York. pp. 292, 293, 344.*
Dinesh-Kumar, S.P. et al. Dec. 19, 2000. Structure-function analysis of the tobacco mosaic virus resistance gene N. Proceedings of the National Academy of Sciences 97(26): 14789-14794. specif. pp. 14789,14793.*
Verma, H.N. et al. Inhibition and stimulation of tobacco mosaic virus by some amino acids. Plant Disease Problems. Proceedings of the First International Symposium on Plant Pathology. Copyright 1970. Indian Phytopathological Society, S.P. Raychaudhuri, et al. Eds. New Delhi, India. pp. 755-771.specif. pp. 755, 758, 769.*
Devash, Y. et al. Mar. 25, 1984. 5'-dephosphorylated 2', 5'-adenylate trimer and its analogs. Journal of Biological Chemistry 259(6): 3482-3486. specif. pp. 3482, 3485.*
Dale, J.L. et al. Apr. 1955. Effect of some compounds and biological products upon infection by tobacco mosaic virus. Illinois Academy of Science Transactions 47: 65-71. specif. pp. 65, 66, 70.*
Verma, B.K. et al. Oct. 1973. Inhibition of cucumis virus-2 and tobacco ring spot virus by amino acids. Science and Culture 39(10): 471-473. specif. pp. 471, 472, 473.*
EngMT. Igarashi, D. et al. Use of disease resistance enhancer for plants and method of controlling plant disease by using the same. International Patent Application Publication No. (JP)WO 2009/088074 (A1). Pub. Date: May 26, 2011. pp. 1-16.*
Britannica Online Encyclopedia. Solanaceae. Datasheet [online]. Encyclopedia Britannica, Inc. [retrieved on Mar. 21, 2018]. Copyright 2018. Retrieved from the Internet: <URL: https://www.britannica.com/plant/Solanaceae>. pp. 1-2, specif. p. 1.*
Varma, J.P. et al. 1967. Effect of alanine, serine and glutamic acid on the multiplication of tobacco mosaic virus in tobacco. Journal of Phytopathology 58(1): 53-58. specif. pp. 53, 55, 56, 57.*
UC-IPM. Tobamovirus Diseases. Datasheet [online]. Agricultural & Natural Resources, University of California. [retrieved on Mar. 21, 2018]. Copyright 2017. Retrieved from the Internet: <URL: http://ipm.ucanr.edu/PMG/r604100711.html> pp. 1-2, specif. p. 1.*

(Continued)

*Primary Examiner* — Renee Claytor
*Assistant Examiner* — Sharon M. Papciak
(74) *Attorney, Agent, or Firm* — Cermak Nakajima & McGowan LLP; Shelly Guest Cermak (57) ABSTRACT

A virus infection inhibitor containing a fermentation by-product such as an amino acid fermentation by-product and a nucleic acid fermentation by-product is sprinkled onto a plant body of a plant, such as tobacco, tomato, bell pepper, and chili pepper to control a disease induced by infection of a virus such as Tobamovirus viruses and Cucumovirus viruses.

3 Claims, 5 Drawing Sheets

(56) References Cited

OTHER PUBLICATIONS

EngMT—Shimotori, H. et al. Method for controlling disease damage of plant.Japanese Patent Application Publication No. JPH0680530 A. Date of Publication: Mar. 22, 1994. pp. 1-7. specif. pp. Abstract, 4, 5, 7.*
Matthews, R. E. F., "Effects of some Purine analogues on Tobacco Mosaic Virus," J. Gen. Microbiol. 1954;10:521-532.
Supplementary European Search Report for European Patent App. No. 12846612.5 (dated May 11, 2015).
Maiss, E., "Einsatz einer Resistenzinduktion durch Kulturfiltrate von Stachybotrys chartarum (Ehrenb. ex Link) Hughes und Bacillus subtilis (Ehrenberg) Cohn gegen Virosen unter praxisüblichen Anbaubedingungen," Arch. Phytopathol. Pflanzenschutz Berlin, vol. 23, No. 4, 1987, pp. 275-283, with English translation.
Kim, Y. H., et al., "Antiviral Activity of Antibiotic Peptaibols Chrysospemins B and D, Produced by *Apiocrea* sp. 14T against TMV Infection," J. Microbiol. Biotechnol. 2000;10(4):522-528.
Yoneyama, S., et al., Noyaku Binran (Handbook of Agrochemicals), 10th edition, Nobunkyo, Aug. 15, 2004, pp. 386-389, with its partial English translation.
International Search Report for PCT Patent App. No. PCT/JP2012/075542 (dated Dec. 25, 2012).
International Preliminary Report on Patentability for PCT Patent App. No. PCT/JP2012/075542 (dated Jun. 12, 2014).

* cited by examiner

Fig. 1 inoculated leaves (5dpi)

0%   0.1%   0.5%   1.0% deposition shows accumulation of CMV-Y (arrows)

non-inoculated upper leaves (7dpi)

0%   0.1%   0.5%   1.0% signal strength

++   +   +   ±

Fig. 2 non-treatment                    glutamic acid fermentation by-product liquid

Fig. 7 innoculated
leaves
(3dpi)

Fig. 8 innoculated
leaves
(3dpi)

PLANT VIRUS INFECTION INHIBITOR AND A METHOD FOR INHIBITING PLANT VIRUS INFECTION USING THE SAME

This application is a Continuation of, and claims priority under 35 U.S.C. § 120 to, International Application No. PCT/JP2012/075542, filed Oct. 2, 2012, and claims priority therethrough under 35 U.S.C. § 119 to Japanese Patent Application No. 2011-239948, filed Nov. 1, 2011, the entireties of which are incorporated by reference herein.

BACKGROUND OF THE INVENTION

Field of the Invention

The present invention relates to a plant virus infection inhibitor, and a method for inhibiting plant virus infection using the same. The present invention is useful in the fields of agriculture, horticulture, and so forth.

Brief Description of the Related Art

Pathogenic germs that cause plant diseases are roughly divided into three kinds, i.e., filamentous fungi (molds), bacteria, and viruses.

The most prevalent causes of all plant diseases are those caused by filamentous fungi. Filamentous fungi are eucaryotes, and cause 73% of all the plant diseases. However, filamentous fungi have cell structures, life cycles, etc. significantly different from those of plants and animals, and it is easy to develop agricultural chemicals which are selectively and highly effective against specific filamentous fungi. In contrast, although viral diseases cause only about 5 to 7% of all plant diseases, these pathogens are made up of nucleic acids and proteins which are basic substances for life. Viruses proliferate by utilizing the replication, transcription and translation mechanisms of host plants, and therefore it is extremely difficult to develop a substance that selectively or specifically inactivates a certain virus. Accordingly, it is generally considered to be difficult to control viral diseases, and once a viral disease develops, it cannot be cured. Furthermore, if any measures are not taken, it can serve as a new source of infection, and cause further spread of the disease. Although there have been a lot of attempts aiming at control of viral diseases, such as blocking the route of infection using a pesticide or the like, removal of a plant suffering from a disease at an early stage of the disease, and breeding of a plant utilizing a resistance gene, RNA interference, or the like (creation of genetic recombinant), control of viral diseases is currently still very difficult in fact.

For control of plant diseases, the classification or identification of pathogenic viruses at the genus or species level is extremely important. This is because, for viruses of the same genus or species, analogy of vector or characteristics of the viruses may be contemplated, and thereby it becomes possible to choose a method for controlling viral disease or measures against the disease to a certain extent.

An example of a method of controlling viral diseases that has been put into practical use is a method of utilizing the interferential action of viruses. The interferential action refers to a phenomenon that a plant infected with a certain virus is protected from the secondary infection of the virus. Development of attenuated viruses also advances (Japanese Patent Laid-open (Kokai) No. 1-281079), and seedlings inoculated with attenuated CMV beforehand are partly commercialized. However, the serious drawback of this method is that this method is effective only for closely related viruses having highly homologous nucleic acid sequences.

A plurality of substances showing antiviral effect have been reported to date. For example, many substances such as the polysaccharides produced by the *Candida famata* T1 strain or a mutant thereof (Japanese Patent Laid-open No. 2001-72521), proteins derived from *Phytolacca americana* (Japanese Patent Laid-open No. 5-137580), acidic high molecular polysaccharides produced by basidiomycetes belonging to the genus *Fomes* (Japanese Patent Publication (Kokoku) No. 6-21122), high molecular polysaccharides produced in *Schizophyllum* fungus culture (Japanese Patent Laid-open No. 1-272509), alkyl diethylenetriaminoacetates and salts thereof (Japanese Patent Laid-open No. 2-121903), *Camellia sinensis* saponin (Japanese Patent Laid-open No. 7-25718), and polylysine (Japanese Patent Laid-open No. 63-2901) have been reported, however, they have not widely spread at present.

At present, only one kind of antiviral agent, lentemin (trade name of Noda Shokukin Kogyo Co., Ltd.), is registered as an agricultural chemical in Japan (agricultural chemical registration numbers, 15584, 17774, 19439, and 19440), except for attenuated viruses and soil disinfectants. The main ingredient of lentemin is a culture medium extraction component of a shiitake mushroom mycelium produced by culturing mycelia of shiitake mushroom on a solid medium, crushing the medium in which the mycelia spreads in the whole medium, and subjecting the whole medium to extraction. Probably for this reason, the price thereof per unit volume is comparatively expensive. Moreover, the recommended dilution rate of the lentemin solution for controlling viral mosaic disease is as low as 1 to 10 times (Yoneyama et al., Noyaku Binran (Agricultural Chemical Handbook), 10th edition, pp. 387-389, Rural Culture Association Japan), and therefore the cost required for spraying it per unit cultivation area is also extremely higher as compared to other common agricultural chemicals.

A virus infection inhibitor containing a solution obtained by a heat treatment of microbial cells under acidic conditions has been reported (International Patent Publication WO2009/88074), and the ability of this inhibitor to inhibit infection against viruses (wheat and barley dwarf viruses, soybean mosaic virus, alfalfa mosaic virus, potato leaf roll virus) is described therein. However, inhibition of infection of Tobamovirus viruses and Cucumovirus viruses with this inhibitor is not known.

Furthermore, a method of controlling diseases caused by plant pathogenic microbes (pathogenic filamentous fungi) by sprinkling an amino acid fermentation liquid, specifically, a proline fermentation liquid, on plants has been reported (Japanese Patent Laid-open No. 6-80530). However, the effect of amino acid fermentation by-produced liquids for controlling viral diseases has not been previously reported.

SUMMARY OF THE INVENTION

Aspects to be Achieved by the Invention

An aspect of the present invention is to provide an effective and inexpensive virus infection inhibitor for reducing the risk of virus diseases of plants, which are known to be conventionally difficult to control.

Means for Achieving the Aspects

The subject matter of the present invention involves the finding that fermentation by-product liquids have a virus infection inhibition effect. It has been observed that the application of the fermentation by-product liquids can also improve the resistance against viruses in plant tissues to which the liquids were are indirectly applied, an extremely potent virus infection inhibition effect was observed in the regions when the fermentation by-product liquids were directly applied. That is, the virus infection inhibitor of the present invention can induce disease resistance in plants, and further, by directly applying it onto surfaces of plants, infection with viruses can be reduced.

It is an aspect of the present invention to provide a virus infection inhibitor for inhibiting infection of a viruses selected from the group consisting of a Tobamovirus virus, a Cucumovirus virus, and combinations thereof in a plant selected from the group consisting of tobacco, tomato, bell pepper, and chili pepper, which comprises a fermentation by-product selected from an amino acid fermentation by-product and a nucleic acid fermentation by-product.

It is a further aspect of the present invention to provide the inhibitor as described above, wherein the fermentation by-product is an amino acid fermentation by-product.

It is a further aspect of the present invention to provide the inhibitor as described above, wherein the fermentation by-product is a nucleic acid fermentation by-product.

It is a further aspect of the present invention to provide the inhibitor as described above, wherein the amino acid fermentation by-product is a fermentation by-product of glutamic acid, lysine, threonine, phenylalanine, or arginine.

It is a further aspect of the present invention to provide the inhibitor as described above, wherein the nucleic acid fermentation by-product is a fermentation by-product selected from the group consisting of inosine, guanosine, adenosine, inosinic acid, xanthylic acid, guanylic acid, and combinations thereof.

It is a further aspect of the present invention to provide the inhibitor as described above, wherein the Tobamovirus virus is pepper mild mottle virus, tobacco mosaic virus, or tomato mosaic virus; and the Cucumovirus virus is cucumber mosaic virus.

It is a further aspect of the present invention to provide a method for inhibiting infection of a virus in a plant, which comprises sprinkling the virus infection inhibitor as described above at a concentration of 0.01 to 10% (v/v) in terms of fermentation by-product liquid concentration onto a plant body of a plant selected from the group consisting of tobacco, tomato, bell pepper, chili pepper, and combinations thereof.

It is a further aspect of the present invention to provide the method as described above, wherein the virus infection inhibitor is sprinkled 1 to 10 days before a day on which virus infection is expected.

DESCRIPTION OF THE PREFERRED EMBODIMENTS

The plant virus infection inhibitor of the present invention (henceforth also referred to as the "agent of the present invention" or simply as the "agent") can include an amino acid fermentation by-product, a nucleic acid fermentation by-product, or both. "Inhibition of virus infection" can mean controlling or ameliorating at least a disease of a plant caused by a pathogenic virus, and the action for it is not limited, and may be based on any of suppression of invasion of viruses into plant cells, suppression of proliferation of viruses, and other mechanisms. Therefore, the "virus infection inhibitor" may be called a "virus disease controlling agent". Moreover, the "method for inhibiting infection of a virus in plant" may be a "method for controlling a plant virus disease".

The amino acid fermentation by-product is a generic term for referring to a by-product liquid remaining after removal of amino acid produced by fermentation from the fermentation broth (amino acid fermentation by-product liquid), a concentrate or dried solid thereof, a fractionation product thereof, and so forth. In this amino acid fermentation by-product, the amino acid and/or a derivative thereof produced by the fermentation remains.

The nucleic acid fermentation by-product is a generic term for referring to a by-product liquid remaining after removal of nucleic acid produced by fermentation from the fermentation broth (nucleic acid fermentation by-product liquid), a concentrate or dried solid thereof, a fractionation product thereof, and so forth. In this nucleic acid fermentation by-product, the nucleic acid and/or a derivative thereof produced by the fermentation remains.

The fermentation by-product liquid may contain an acid or the like which was added in order to collect the objective substance from the medium, and may be subjected to a heat treatment for disinfection etc.

The amino acid or nucleic acid contained in the amino acid fermentation by-product or nucleic acid fermentation by-product is not particularly limited, and can contain various amino acids and nucleic acids described herein. Furthermore, the amino acid or nucleic acid contained in the fermentation by-product may consist of one or two or more kinds of amino acids or nucleic acids.

Specific examples of the amino acid fermentation by-product include, for example, a circulating fluid obtained by adjusting the pH of a fermentation liquid of a basic or neutral amino acid such as L-lysine and L-glutamine, and passing the liquid through a strongly acidic cationic resin to absorb the amino acid on the resin, and a concentrate thereof, as well as a mother liquid obtained by adjusting pH of a fermentation liquid of an acidic amino acid such as L-glutamic acid to the isoelectric point with a mineral acid, and separating deposited crystals of the amino acid by solid/liquid separation, and a concentrate thereof.

Furthermore, specific examples of the nucleic acid fermentation by-product include, for example, a mother liquid obtained by crystallizing a nucleic acid such as inosinic acid and guanylic acid in a fermentation liquid for the nucleic acid by cooling crystallization or concentration crystallization utilizing difference in solubility, and separating precipitated crystals by solid/liquid separation, and a concentrate thereof. Furthermore, the nucleic acid fermentation by-product liquid is not limited to a by-product liquid obtained from a fermentation liquid in which a nucleic acid such as inosinic acid and guanylic acid is directly generated by fermentation after the objective substance is collected, and it may be a by-product liquid obtained from a fermentation liquid containing a nucleotide obtained by enzymatically or microbiologically phosphorylating a nucleoside such as inosine or guanosine in the fermentation liquid after the target substance is collected.

Such fermentation by-products usually contain, as solid content, various amino acids (containing 5 to 14% by weight in the case of a 5- to 20-fold concentrate) or various nucleic acids (containing 5 to 15% by weight in the case of a 5- to 20-fold concentrate), as well as a lot of nutrients such as saccharides, fermentation bacterial cells, organic nitrogens, mineral nitrogens, and vitamins (solid content is 30 to 50% by weight).

The fermentation by-product of an amino acid in a fermentation by-product liquid obtained after separation of the target amino acid and before such an operation as concentration, exsiccation, or fractionation can contain 1 mM or more, 2 mM or more, 5 mM or more, of the amino acid. Furthermore, the fermentation by-product of an amino acid may contain amino acids other than the amino acid as the target substance of the fermentation. Furthermore, the fermentation by-product of an amino acid may be a mixture of two or more kinds of fermentation by-products obtained by fermentation production of different amino acids as target substances.

The fermentation by-product of a nucleic acid in a fermentation by-product liquid obtained after separation of the objective nucleic acid and before such an operation as concentration, exsiccation, or fractionation can contain 1 mM or more, 2 mM or more, or 10 mM or more, of the nucleic acid. Furthermore, the fermentation by-product of a nucleic acid may contain nucleic acids other than the nucleic acid as the target substance of the fermentation. Furthermore, the fermentation by-product of a nucleic acid may be a mixture of two or more kinds of fermentation by-products obtained by fermentation production of different nucleic acids as target substances.

Specific examples of the amino acid fermentation by-product liquid include those obtained by culturing a microorganism belonging to the genus *Corynebacterium, Pantoea*, or *Escherichia* in a medium containing a sugar source such as sucrose, starch, sugarcane, corn, sugar beet, cassava, algae such as Euglena, or a carbon source obtained from an oil source such as rapeseed oil, palm oil, olive oil, sunflower oil, soybean oil, rice oil, hemp oil, fish oil, lard, beef tallow, and algae such as raphidophyte algae and *Botryococcus* algae as the main raw material, and a nitrogen source, as well as nutrients such as inorganic ions and others, lowering pH of the medium after the culture with sulfuric acid or hydrochloric acid, separating the precipitated amino acid, and subjecting the medium to concentration or heat treatment. The stock solution of such a fermentation by-product liquid usually contains about 1 to 10% (W/V) of amino acids.

Furthermore, specific examples of the nucleic acid fermentation by-product liquid include those obtained by culturing a microorganism belonging to the genus *Bacillus* in a medium containing sucrose, starch, sugarcane, corn, or carbon source made from sugar beet or cassava as the main raw material, and a nitrogen source, and optionally containing nutrients such as inorganic ions and others, lowering the pH of the medium after the culture with sulfuric acid or hydrochloric acid, separating precipitated inosine and guanosine by crystallization, subjecting the medium to concentration or heat treatment to obtain a fermentation by-product liquid, adding thereto the abovementioned concentrated and heat treated liquid which has been obtained by phosphorylating the inosine and guanosine with a microorganism belonging to the genus *Morganella, Serratia, Klebsiella, Enterobacter, Chromobacterium, Cedecea*, or *Escherichia*, and separating the produced inosinic acid or guanylic acid. The stock solution of such a fermentation by-product liquid usually contains about 1 to 8% (W/V) of inosinic acid and 1 to 6% (W/V) of guanylic acid.

Examples of the microorganism and medium which can be used for the fermentation can include, for example, those described in European Patent Publications EP 0643135 B, EP 0733712 B, EP 1477565 A, EP 0796912 A, EP 0837134 A, EP 1170376 A, International Patent Publications WO01/53459, WO2005/010175, WO96/17930, and so forth.

The L-glutamic acid fermentation by-product liquid, L-threonine fermentation by-product liquid, and the nucleic acid fermentation by-product liquid (mixture of inosine, guanosine, adenosine, inosinic acid, and guanylic acid fermentation by-product liquids) used in the Example section described later were obtained as described above by using *Corynebacterium glutamicum, Escherichia coli*, or *Bacillus amyloliquefaciens*.

Examples of the amino acid as the target substance of the fermentation or the amino acid contained in the fermentation by-product include basic amino acids such as lysine, ornithine, arginine, histidine, and citrulline, aliphatic amino acids such as isoleucine, alanine, valine, leucine, and glycine, amino acids which are hydroxymonoaminocarboxylic acids such as threonine and serine, cyclic amino acids such as proline, aromatic amino acids such as phenylalanine, tyrosine, and tryptophan, sulfur-containing amino acids such as cysteine, cystine, and methionine, acidic amino acids such as glutamic acid and aspartic acid, and amino acids having an amide group in side chains such as glutamine and asparagine. Furthermore, the amino acid may be an amino acid derivative, for example, trimethylglycine, betaine such as carnitine, monomethylglycine, dimethylglycine, or γ-aminobutyric acid (GABA).

Among these, glutamic acid, lysine, phenylalanine, arginine, alanine, glutamine, aspartic acid, asparagine, glycine, GABA, betaine, dimethylglycine, leucine, methionine, cysteine, tyrosine, proline, citrulline, valine, serine, valine, isoleucine, and tryptophan are preferred, and glutamic acid, lysine, phenylalanine, and arginine are more preferred.

The amino acid includes free amino acids and/or salts thereof, for example, sulfates, hydrochlorides, carbonates, ammonium salts, sodium salts, and potassium salts. Furthermore, although the amino acid may be an L-amino acid or D-amino acid, it is preferably an L-amino acid.

Examples of the nucleic acid as the target substance of the fermentation or the nucleic acid contained in the fermentation by-product include a nucleoside, nucleotide, nucleobase, and so forth.

The nucleobase may be purine or pyrimidine. The nucleoside may be a purine nucleoside or a pyrimidine nucleoside, and the nucleotide may be a purine nucleotide or a pyrimidine nucleotide. Furthermore, although the saccharide constituting the nucleoside and nucleotide may be ribose or deoxyribose, it is preferably ribose.

Examples of the nucleobase include adenine, guanine, thymine, cytosine, uracil, xanthine, and hypoxanthine.

Examples of the nucleoside include adenosine, guanosine, thymidine, cytidine, uridine, xanthosine, inosine, and 2'-deoxy compounds of these.

Examples of the nucleoside include adenylic acid (adenosine-5'-phosphate), guanylic acid (guanosine-5'-phsophate), thymidylic acid (thymidine-5'-phosphate), uridylic acid (uridine-5'-phosphate), xanthylic acid (xanthosine-5'-phosphate), inosinic acid (inosine-5'-phosphate), and 2'-deoxy compounds of these.

As the nucleoside, a purine nucleoside is preferred, and inosine and guanosine are more preferred.

As the nucleotide, a purine nucleotide is preferred, and inosinic acid and guanylic acid are more preferred.

The nucleic acid may be a free compound or may be a salt such as a sodium salt and a potassium salt.

The aforementioned fermentation by-product of a nucleic acid may further contain a phosphorylated nucleic acid as described above.

The plant virus infection inhibitor of the present invention can contain an amino acid fermentation by-product or nucleic acid fermentation by-product as described above. Furthermore, the plant virus infection inhibitor may contain both the fermentation by-product of an amino acid and the fermentation by-product of a nucleic acid.

Figure 4:
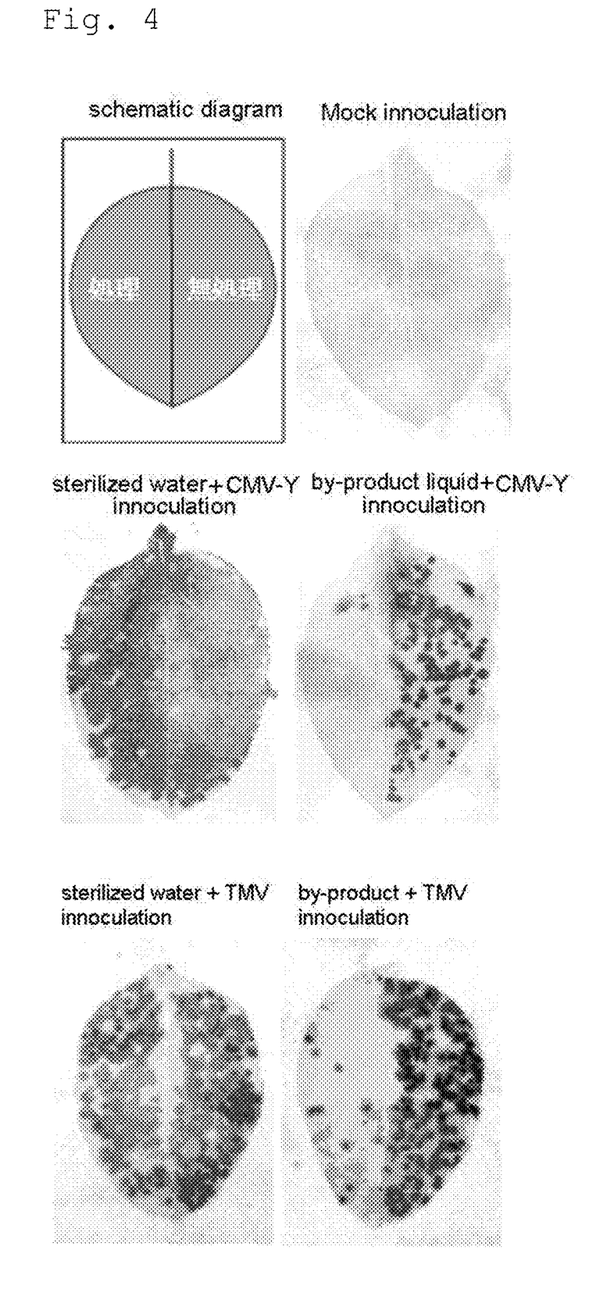
FIG. 4 shows effect of directly sprinkling a glutamic acid fermentation by-product liquid (photographs showing plant morphology). The treatment scheme using the fermentation by-product liquid is shown with a schematic diagram. Marked virus infection inhibition effect is observed for the regions treated with the fermentation by-product liquid (Mock inoculation means false inoculation).

Since the agent of the present invention can also enhance resistance to a virus in a plant tissue to which the agent is not directly applied as shown in Example 2 below, the method for applying it to a plant is not particularly limited. However, since an extremely high virus infection inhibition effect was observed in the regions to which the agent was directly applied, it is particularly preferably sprinkled on a plant body, for example, the whole plant body or leaf surfaces.

The agent of the present invention can be in a form that can be sprinkled, and may be in the form of, for example, any of liquid agent such as emulsion, wettable powder, oil, aerosol, and flowable agent, but it is preferred that it can be uniformly sprinkled on plant surfaces, since the agent show especially high effect in the sprinkled regions. Furthermore, the agent may be a powdery agent or solid agent, so long as it can be prepared in a form that enables sprinkling thereof at the time of use. The "sprinkling" includes "spraying" as for a liquid agent.

The content of the amino acid fermentation by-product, nucleic acid fermentation by-product, amino acid, or nucleic acid in the agent is not particularly limited, but can be suitably determined depending on type of plant, application amount of the agent to plants, and so forth. Specifically, as for the amino acid fermentation by-product or nucleic acid fermentation by-product, when the agent is a liquid, or when the agent is a solid but is used as a liquid at the time of use, the content can be 0.01% by weight or more, 0.1% by weight or more, in terms of the content of the fermentation by-product liquid. Although the maximum content is not particularly limited, the content can be 10% by weight or less, 1% by weight or less, 0.5% by weight or less. The expression "in terms of the content of the fermentation by-product liquid" means that when the fermentation by-product is a concentrate, dried product or the like of a fermentation by-product liquid, the content is represented by weight content of the original fermentation by-product liquid.

As described above, the agent of the present invention has an action of significantly controlling viral infection in a region where the agent is directly applied by sprinkling or coating of the agent, in addition to the action of inducing resistance to a virus.

Although the agent can be applied 1 to 10 days before the day on which virus infection is expected, it can be sprinkled at a frequency as high as possible in view of such maintenance of induced resistance and control of viral infection in a region where the agent is applied as described above, and it is recommended to sprinkle it at a frequency of once every 3 to 7 days, or at least once every two weeks. In the case of a liquid agent, an appropriate concentration of the liquid to be sprinkled is generally 0.1 to 1.0% (v/v) in terms of the fermentation by-product liquid, but if it is sprinkled at a concentration higher than required, phytotoxicity may appear depending on the type of plant, and therefore, strictly speaking, the concentration to be sprinkled differs depending on the type of the agricultural product to be protected. For example, it can be 0.2 to 2.0% (v/v) in the case of tobacco, and it can be 0.05 to 1.0% (v/v) in the case of tomato.

Furthermore, although the sprinkling amount may differ depending on the type of the agricultural product, total area of leaves, and dilution rate of the agent, it can be 1 to 100 kg/hectare in terms of the solid content of the fermentation by-product.

Since an antifoam component usually remains in the fermentation by-product liquid, and this shows spreading effect, the agent can be used without adding any spreading agent, but in order to more effectively apply the agent on the surfaces of agricultural products, it is recommended to further add a spreading agent at a final concentration of 0.01 to 0.5% by weight.

Examples of plant viruses, the infection of which can be inhibited according to the present invention, include Tobamovirus viruses such as tobacco mosaic virus, tomato mosaic virus, and pepper mild mottle virus, and Cucumovirus viruses such as cucumber mosaic virus.

In order to effectively inhibit a viral disease, sprinkling of the agent of the present invention to the whole plant body may be combined with blocking the route of infection using a pesticide, removal of a plant suffering from a disease at an early stage of the disease, vaccination with attenuated viruses, and so forth.

EXAMPLES

Hereafter, the present invention will be further specifically explained with reference to the following non-limiting examples.

Example 1

Plant Virus Infection Inhibition Effect of Amino Acid Fermentation by-Product Liquid To the whole bodies of tobacco plants (*Nicotiana tabacum* cv. *Samsun*) grown for about five weeks after seeding, L-glutamic acid fermentation by-product liquids diluted to concentrations of 0% (sterilized water), 0.1% (v/v), 0.5% (v/v), and 1.0% (v/v) were sprinkled, and the plants were cultivated for two days. To the whole surface of one lower leaf of an appropriate size, Carborundum (Nakalai Tesque) was thinly sprinkled, and cucumber mosaic virus (CMV) Y strain or tobacco mosaic viruse (TMV) was artificially inoculated by dropping 100 µl per leaf of a 5 µg/ml solution of CMV or a 2.5 µg/ml solution of TMV, and spreading the solution by sweeping the whole surface of the leaf with fingers wearing a rubber glove. The inoculated leaf was collected 5 days after the inoculation, and an upper leaf was collected 9 days after the inoculation. Leaf sap prepared from each leaf was transferred to filter paper, and localization of CMV or TMV was detected by immunostaining (TPI) using an anti-CMV antiserum or an anti-TMV antiserum.

Figure 1:
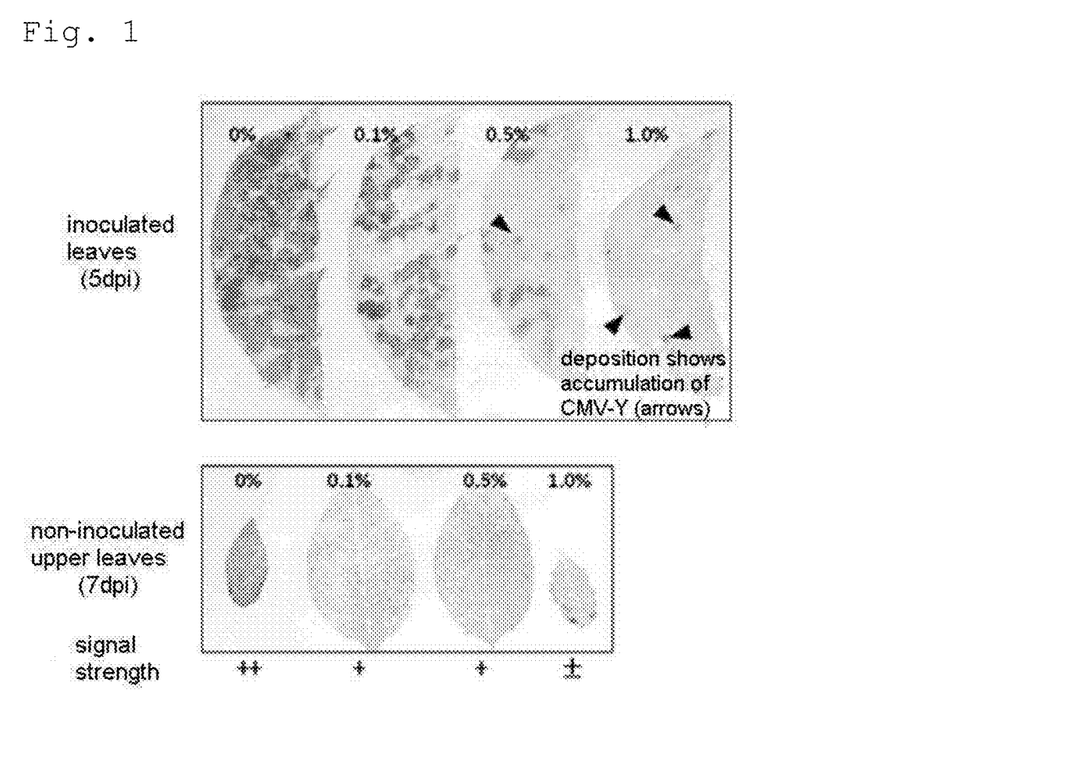
FIG. 1 shows effect of sprinkling a glutamic acid fermentation by-product liquid for inhibiting infection of cucumber mosaic virus in tobacco plants (photographs showing plant morphology). The numerical values (0%, 0.1%, 0.5%, 1.0%) shown at the tops of the inoculated leaves and non-inoculated upper leaves indicate concentrations of the amino acid fermentation by-product liquids used for the treatment (dpi: day post-inoculation, number of day after inoculation, the same shall apply to the following drawings).
Figure 2:
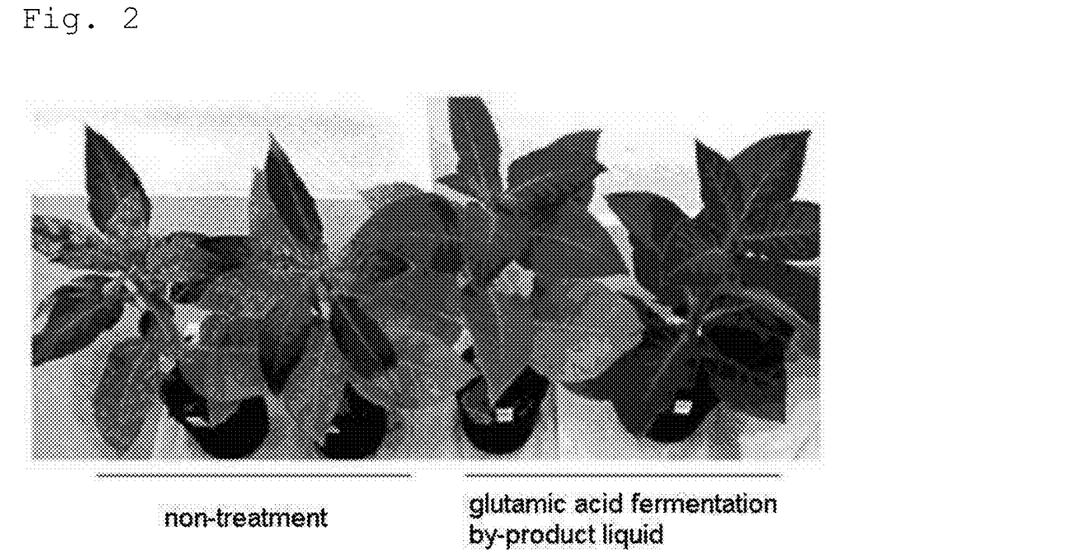
FIG. 2 shows effect of sprinkling a glutamic acid fermentation by-product liquid for delaying cucumber mosaic virus disease (photographs showing plant morphology). Tobacco plants about one month after being inoculated with cucumber mosaic virus are shown.
Figure 3:
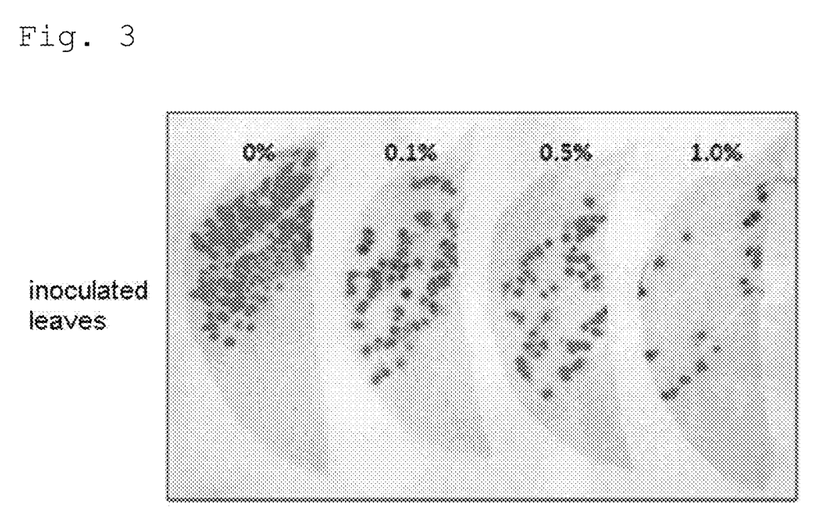
FIG. 3 shows effect of sprinkling a glutamic acid fermentation by-product liquid for inhibiting infection of tobacco mosaic virus in tobacco plants (photographs showing plant morphology). The numerical values shown at the tops of the inoculated leaves indicate concentrations of the amino acid fermentation by-product liquids used for the treatment.

As a result, there was observed a tendency that the number of infection sites decreased in a manner dependent on the concentration of the fermentation by-product liquid used for the treatment for the inoculated leaves (FIG. 1). Furthermore, inhibition of transfer of CMV to upper leaves was observed for the 0.5 to 1.0% fermentation by-product liquid-treated groups. In this experiment, although CMV may have been observed on the upper leaves, the staining signal tended to become lower in a fermentation by-product liquid concentration-dependent manner. Furthermore, in the treated groups, prolongation of time until symptoms appeared was also observed (FIG. 2). The same phenomena as these were confirmed also in the experiment where the plants were infected with TMV (FIG. 3). On the basis of these experimental results, it was estimated that the fermentation by-product liquid shows an effect of inhibiting virus infection through sprinkling thereof on leaf surfaces, and invasion amount of virus is reduced as a result to provide retardation of development of systemic infection.

Example 2

Effective Inhibition of Virus Infection Provided by Direct Application of Amino Acid Fermentation by-Product Liquid As one of the responses against viral diseases, activation of the salicylic acid pathway can be mentioned. For example, it is widely known that sensitivity to viruses increases in a plant body in which an enzyme that decomposes salicylic acid is overexpressed, and it is considered that the activation of the salicylic acid pathway is one of the resistance mechanisms of plants against viruses. Furthermore, salicylic acid is a signal factor of plants, and is a plant hormone that induces systemic resistance induction (systemic acquired resistance). In order to verify whether the inhibition of virus infection observed with a fermentation by-product liquid is induced through activation of this pathway or not, the following experiment was performed.

A 1.0% (v/v) glutamic acid fermentation by-product liquid or sterilized water was applied to a half surface area of a leaf (schematic diagram shown in FIG. 4) of a tobacco plant cultivated under the same conditions as those of Example 1, and the plant was further cultivated for two days. Then, CMV or TMV was inoculated on the whole leaf in same manner as that of Example 1, and the inoculated leaf was collected after cultivation for three days. Each leaf sap was transferred to filter paper, and localization of each virus was detected by TPI using an anti-CMV antiserum or an anti-TMV antiserum.

If the biosynthesis of salicylic acid or the systemic acquired resistance causes the inhibition of virus infection, marked infection spots should appear also on the half surface of the leaf not directly applied with the fermentation by-product liquid.

As a result, in the leaves applied with the fermentation by-product liquid, the number of the infection spots decreased in the half of the leaf surface not directly applied with the fermentation by-product liquid as compared to the leaf treated with sterilized water (FIG. 4). Since it had already been revealed that residue of fermentation bacterial cells contained in a fermentation by-product liquid has an elicitar activity that induces resistance (WO2009/88074), it was considered that the resistance was induced also in the right half not applied with the fermentation by-product liquid, and the virus infection inhibition effect of a certain level was observed as a result.

Furthermore, it was unexpectedly observed that the number of infection spots more markedly decreased specifically in location directly in contact with the fermentation by-product liquid (FIG. 4). On the basis of this result, it was considered that the inhibition of the virus infection observed with the fermentation by-product liquid was caused by a certain reaction or response characteristically taking place in a region where the fermentation by-product liquid was directly applied, in addition to the induction of disease resistance of the plant induced by the elicitar contained in the fermentation by-product liquid.

Example 3

Virus Infection Inhibition Effect in Tomato

Figure 5:
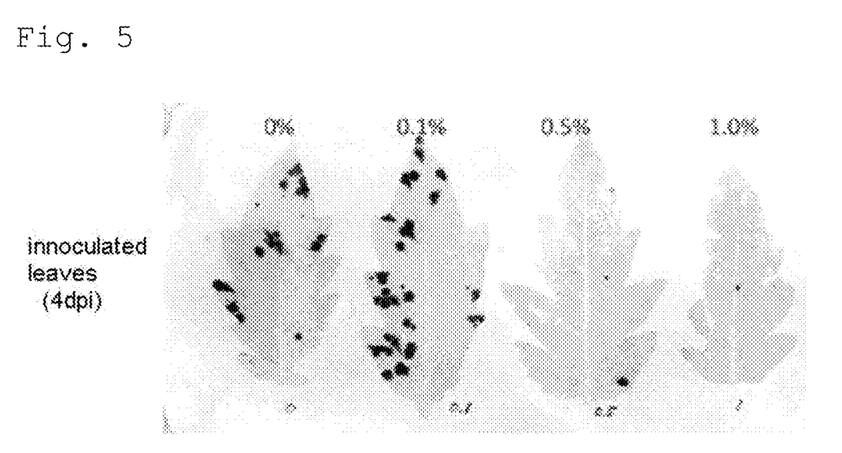
FIG. 5 shows inhibition of cucumber mosaic virus infection induced by sprinkling a glutamic acid fermentation by-product liquid on tomato plants (photographs showing plant morphology). The numerical values shown at the tops of the inoculated leaves indicate concentrations of the amino acid fermentation by-product liquids used for the treatment.

Two days after sprinkling of a glutamic acid fermentation by-product liquid on leaf surfaces of tomato plants (*Solanum lycopersicum*, variety: Momotaro Fight), 5 µg/ml of CMV was inoculated in the same manner as that of Example 1. After four days, localization of CMV was detected by TPI using an anti-CMV antiserum. As a result, a fermentation by-product liquid concentration-dependent decrease of the number of virus infection spots was observed (FIG. 5).

Example 4

Virus Infection Inhibition Effect in Bell Pepper

Figure 6:
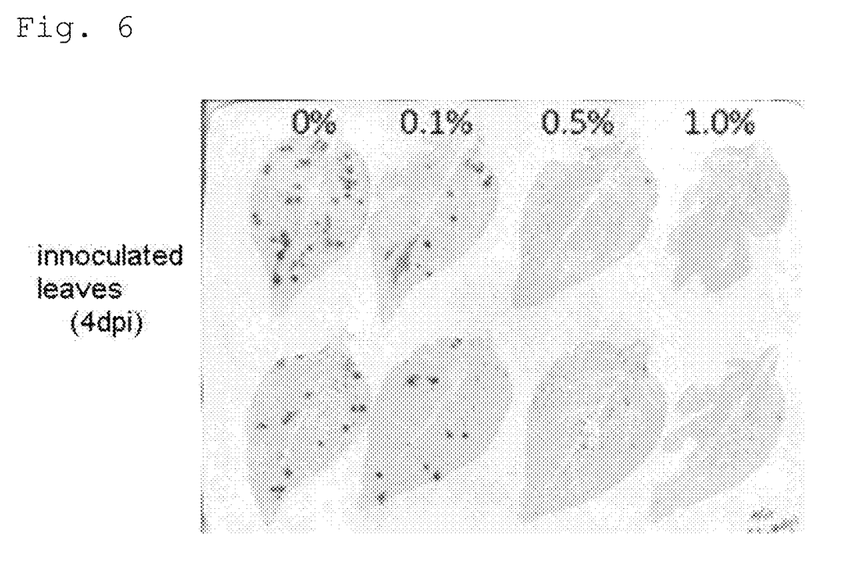
FIG. 6 shows inhibition of cucumber mosaic virus infection induced by sprinkling a glutamic acid fermentation by-product liquid on bell pepper plants (photographs showing plant morphology). The numerical values shown at the tops of the inoculated leaves indicate concentrations of the amino acid fermentation by-product liquids used for the treatment.

Two days after sprinkling a glutamic acid fermentation by-product liquid on leaf surfaces of bell pepper plants (*Capsicum annuum*, variety: Shosuke), 5 µg/ml of CMV was inoculated in the same manner as that of Example 1. After four days, localization of CMV was detected by TPI using an anti-CMV antiserum. As a result, a fermentation by-product liquid concentration-dependent decrease of the number of virus infection spots was observed in the bell pepper plants (FIG. 6), as in the cases of tobacco and tomato plants.

Example 5

Figure 7:
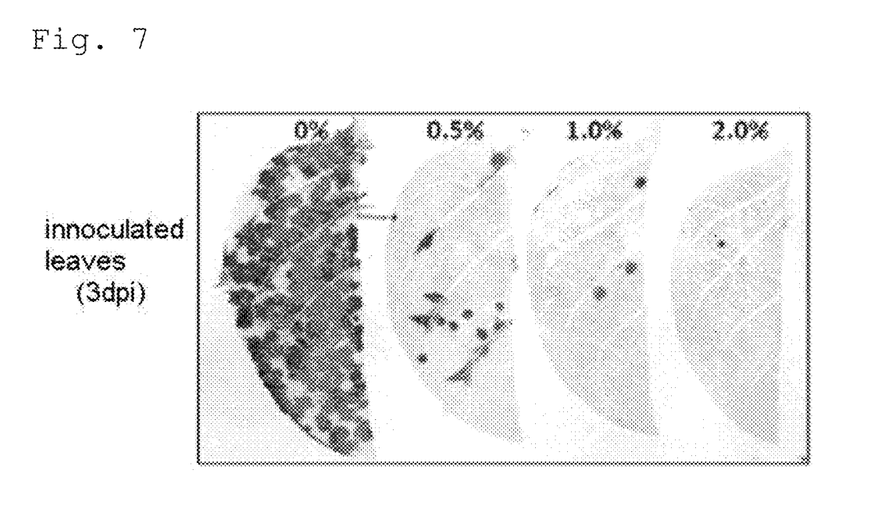
FIG. 7 shows effect of sprinkling a threonine fermentation by-product liquid on leaf surfaces for inhibiting infection of cucumber mosaic virus (photographs showing plant morphology). The numerical values (0%, 0.5%, 1.0%) shown at the tops of the inoculated upper leaves indicate concentrations of the threonine fermentation by-product liquids used for the treatment.

Inhibition of Virus Infection with by-Product Liquid of Fermentation for Amino Acid Other than Glutamic Acid In all the experiments described above, by-product liquids of fermentation for glutamic acid were used. Therefore, in order to verify whether a by-product liquid of fermentation for amino acid other than glutamic acid also has the same action, in the same manners as those of Example 1, a fermentation by-product liquid of L-threonine fermentation was applied to tobacco plants, CMV was inoculated, and after 3 days, localization of the virus was detected. As a result, a concentration-dependent decrease of the number of infection spots was observed (FIG. 7), as in the case of using the glutamic acid fermentation by-product liquid. This result suggests that a fermentation by-product liquid for amino acid other than glutamic acid also has an effect of inhibiting virus infection.

Example 5

Inhibition of Virus Infection with Nucleic Acid Fermentation by-Product Liquid

Figure 8:
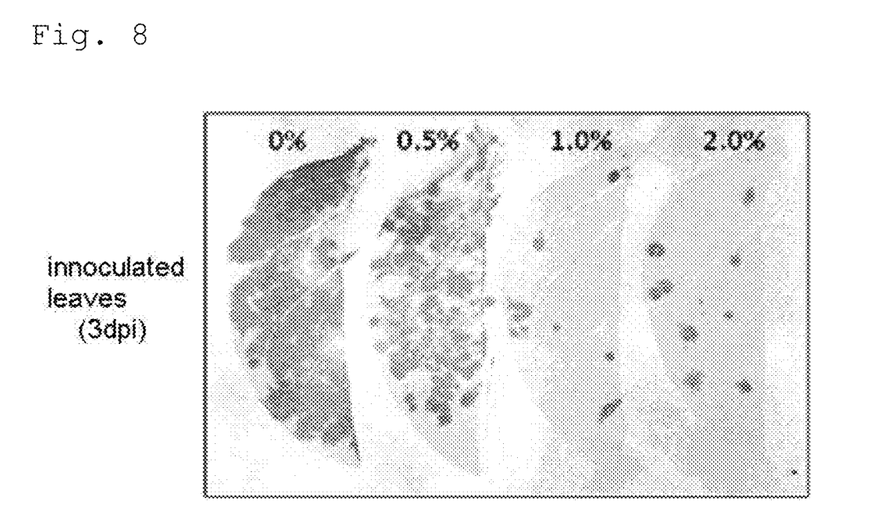
FIG. 8 shows effect of sprinkling a nucleic acid fermentation by-product liquid (mixture of inosine, guanosine, adenosine, inosinic acid, and guanylic acid fermentation by-product liquids) on leaf surfaces for inhibiting infection of cucumber mosaic virus (photographs showing plant morphology). The numerical values (0%, 0.5%, 1.0%) shown at the tops of the inoculated upper leaves indicate concentrations of the nucleic acid fermentation by-product liquids used for the treatment.

In order to verify whether a nucleic acid fermentation by-product liquid also has the effect, a nucleic acid fermentation by-product liquid (mixture of inosine, guanosine, adenosine, inosinic acid, and guanylic acid fermentation by-product liquids) was sprinkled on leaf surfaces of tobacco plants. Then, in the same manner as that of Example 1, 5 µg/ml of CMV was inoculated, and after four days, localization of CMV was detected by TPI using an anti-CMV antiserum. As a result, a fermentation by-product liquid concentration-dependent decrease of the number of virus infection spots was observed, as in the case of using the amino acid fermentation by-product liquid (FIG. 8). This result suggests that a nucleic acid fermentation by-product liquid also has an effect of inhibiting virus infection.

INDUSTRIAL APPLICABILITY

The present invention enables providing an effective plant virus infection inhibitor, and virus diseases in various plants are thereby reduced.

Since by-product liquids remaining after amino acid fermentation or nucleic acid fermentation can be used for the plant virus infection inhibitor of the present invention, it can be easily obtained at a low cost, and can also be produced in a large scale.

While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

The invention claimed is:

1. A method for inhibiting infection of a virus in a plant, which comprises sprinkling a virus infection inhibitor onto a plant body of tobacco,
    wherein the virus infection inhibitor comprises a fermentation by-product at a concentration of 0.1% to 1.0% (V/V), and the fermentation by-product is an amino acid fermentation by-product comprising 1% to 10% (W/V) of L-glutamic acid,
    wherein the virus is Tobamovirus.

2. The method according to claim 1, wherein said sprinkling occurs 1 to 10 days before an expected virus infection.

3. The method according to claim 1, wherein the amino acid fermentation by-product is obtained by culturing a bacterium belonging to the genus *Corynebacterium*, *Pantoea*, or *Escherichia*.

* * * * *